Nov. 13, 1962 C. L. FARRAND 3,064,218
POSITION MEASURING TRANSFORMER
Filed June 5, 1959 2 Sheets-Sheet 2
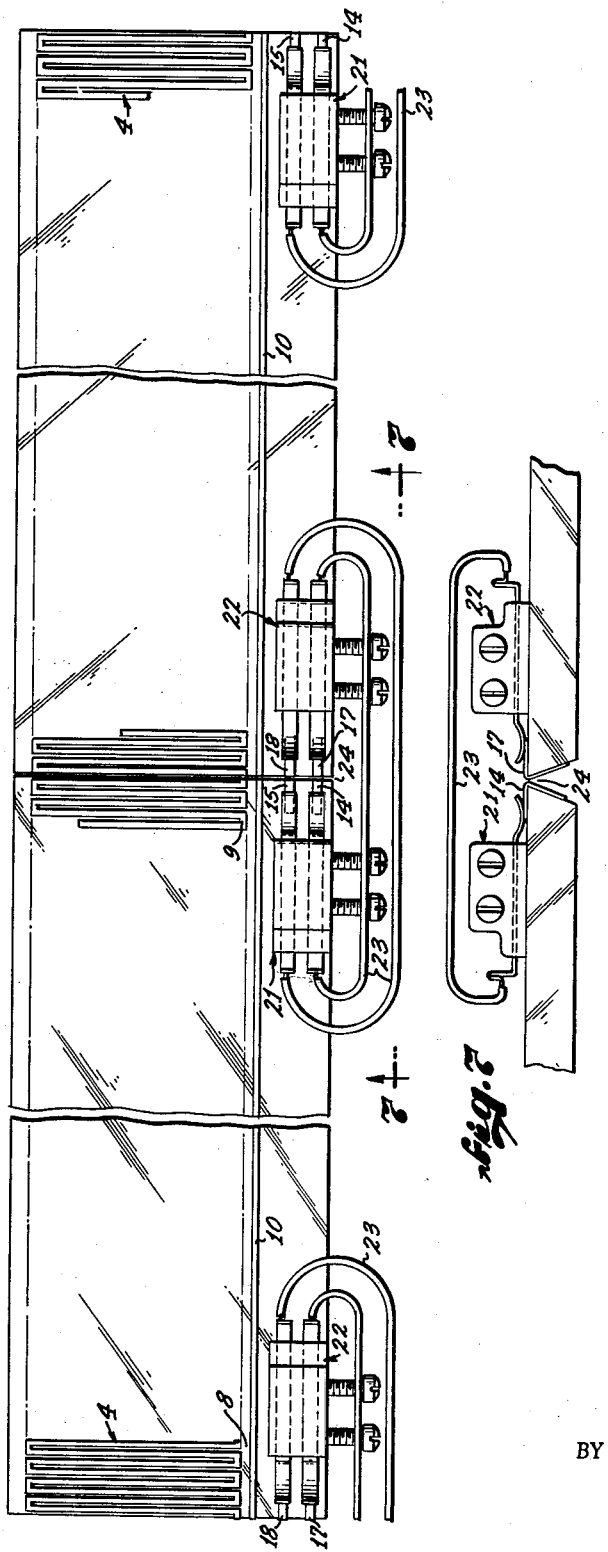
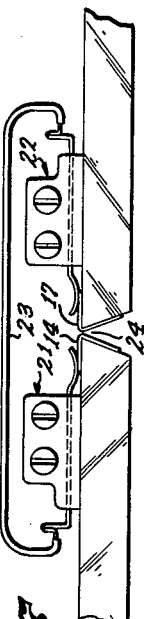
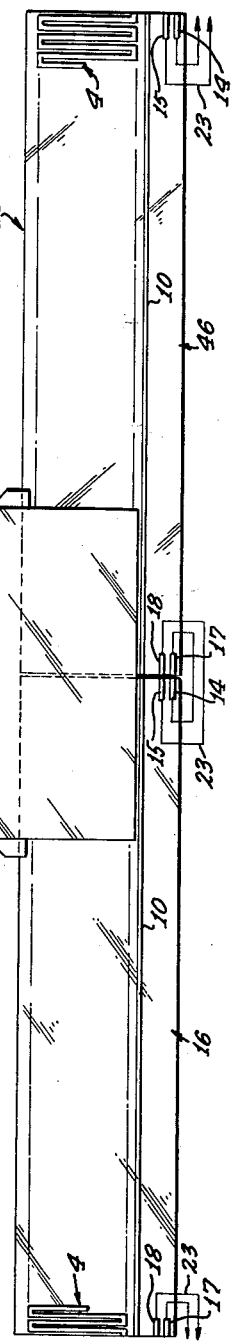
CLAIR L. FARRAND,
INVENTOR.
BY
ATTORNEY.

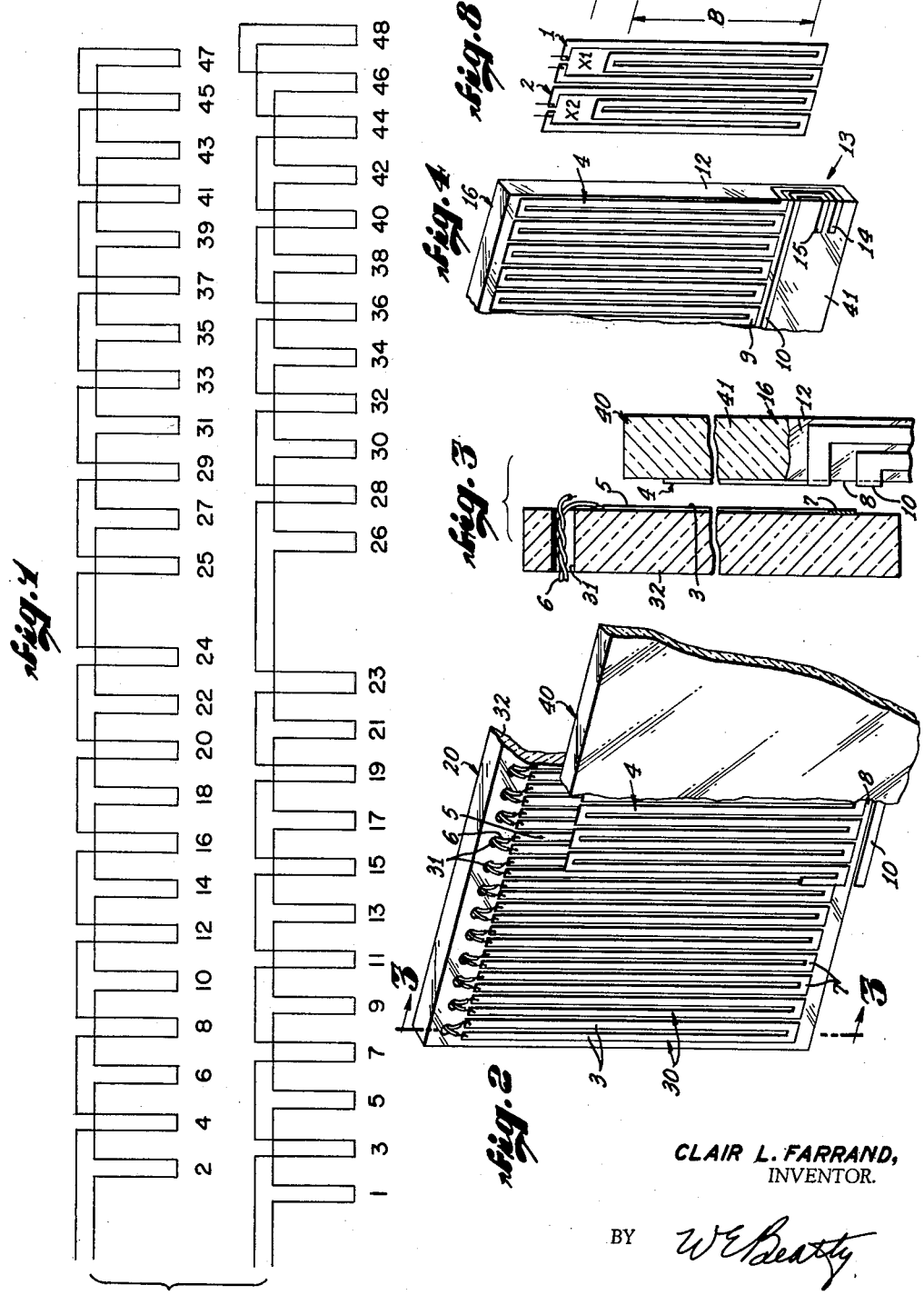

United States Patent Office 3,064,218
Patented Nov. 13, 1962

3,064,218
POSITION MEASURING TRANSFORMER
Clair L. Farrand, Bronxville, N.Y., assignor to Inductosyn Corporation, Carson City, Nev., a corporation of Nevada
Filed June 5, 1959, Ser. No. 818,356
2 Claims. (Cl. 336—129)

The invention relates to a position measuring transformer of the type described and claimed in Patent 2,799,835 to Tripp et al., patented July 16, 1957. This type of transformer employs inductively related relatively movable members of which one has a continuous winding, the other member having groups or sectors of windings quadraturely related, both members having active conductor portions which are parallel and extend transversely to the direction of relative movement of the members.

An object of the invention is to maintain the sinusoidal correspondence of the coupling wave by avoiding couplings which have wave lengths which correspond to or are due to groups of poles and the end bars or conductors and the conductors required for their connections.

A further object is to avoid the coupling effects due to mal-positioning of the sections of one member i.e., scales, end-to-end wherein the scale sections are out of phase or have unequal air gaps.

These objects are accomplished by electromagnetically coupling an equal length of parallel conductor portions of one member which are disposed transversely to the direction of displacement to the same equal length of parallel conductor portions of the other member which are likewise disposed, throughout the relative displacement of the members, and reducing the coupling between the conductor portions or end bars or turns of one member which are parallel to the direction of displacement and the corresponding conductor portions or end bars or turns of the other member, by bringing the center lines of the groups or sectors closer together.

More specifically, the above objects are accomplished by providing an improved position measuring transformer having the following three improvements, (1) balanced windings in accordance with Foster patent application Ser. No. 658,578, filed May 13, 1957, for Pattern for Slider of Position Measuring Transformer, (2) increased length of conductors for the sector winding, and (3) U type sectors instead of Ws.

(1) The advantages of balanced windings are discussed in patent application Ser. No. 658,578.

(2) Increasing length minimized effects of the coupling of the end bars to the scale. In the previous slider, the requirement of bringing out conductors for wiring caused the sector to become anti-symmetrical about the horizontal center line. Hence, unequal couplings between end bars at top and bottom were encountered.

In the old, or W type slider, the end bars in the slider are unequal in number, 1 on top, 2 on bottom, yet contribute to the coupling to the scale. For perfect alignment, doubtless this would not cause trouble. However, with the necessity of butting one scale to another, with the variations of manufacturing and assembly errors, the shift of one scale conductor end bar vertically would be scanned by the slider end bars. This scanning would be unequal for top bar and lower bar of the slider W and therefore constitutes an unwanted error.

The longer slider conductors of the present invention remove the end bars from coupling altogether, reducing this effect.

The above discussion pertains to either W or U type sectors, the length of conductors being the only factor considered.

(3) The third improvement is to reduce the number of conductors per sector to a minimum—two. This has the two-fold effect of (a) increasing the number of conductors for the same over-all pattern length, and (b) shifting the sector center lines closer to each other.

Increasing the number of conductors per pattern length improves the coupling efficiency, since more scale conductors are scanned by the slider pattern. This increase of coupling is an advantage in that it lifts the induced voltage higher above "noise," which is usually a constant level, thus improving resolution. The averaging of random scale conductor placement errors is also improved by this increase.

Shifting the sector center lines closer to each other decreases the effects of non-random scale conductor placement errors such as are encountered when two scales are butted together improperly. This improper placement can occur in three directions—lateral, longitudinal or height.

This type of sharp change would be scanned by the slider as it passes from one scale to another, and as it does so, the windings alternate with each other their scanning of this placement error. Hence, the smaller the slider sector, the shorter the distance necessary for the slider to move to bring the next sector to scan. This is desirable because alternate sectors are in different windings, ½ pole apart.

To clarify this point, let us assume that a discontinuity causes a higher coupling ratio between scale and slider. Then the end sector, as it scans this discontinuity, would increase the coupling to its complete winding relative to the other winding. When the next sector scans, then the coupling is equalized between windings, since this sector is in the other winding. The third sector then scans and once again the first winding becomes unbalanced relative to the other, until the fourth sector scans to again equalize.

Thus the discontinuity, as it passes under the slider windings, is scanned by each winding almost simultaneously due to the shorter distance between the U type sector center lines as compared to the W type sector center lines. This allows equalization in each winding to occur within the shortest possible movement of the slider.

Tests have shown that a position measuring transformer having the improved slider of the present invention has a deviation of the order of $\frac{1}{8,000}$ from a sine coupling wave, as compared to a deviation of $\frac{1}{4,000}$ for the prior W type slider.

For further details of the invention reference may be made to the drawings wherein:

FIG. 1 is a schematic view of a wiring pattern for the quadrature windings of the slider.

FIG. 2 is a perspective view of the slider and scale with parts broken away.

FIG. 3 is an enlarged sectional view on line 3—3 of FIG. 2, looking in the direction of the arrows and with parts broken away.

FIG. 4 is a perspective view, with parts broken away, of the scale showing the inner side and one end thereof.

FIG. 5 is a view in elevation showing two scale sections connected together, with a juxtaposed slider, the connectors between adjacent ends of the scale sections being shown schematically.

FIG. 6 is an enlarged view similar to FIG. 5, with the slider removed, with parts broken away, and showing spring contact blocks wired together for connecting adjacent ends of the scale sections.

FIG. 7 is a partial view on line 7—7 of FIG. 6.

FIG. 8 is a schematic perspective view of the prior slider winding and to which reference is made in explaining the present invention.

Referring in detail to the drawings, the prior W group or sector winding for the slider is illustrated in FIG. 8.

If X1 represents the vertical center line through the winding 1, and X2 represents the vertical center line through the winding 2, each such line is at a pole and heretofore this polar distance was .225 inch. The groups 1 and 2 in FIG. 8 are of course merely typical of a winding which may have a large number of groups as described in the above patent.

Instead of having the W type of group as shown in FIG. 8, the present invention provides a slider winding having U-shaped groups, as indicated in FIG. 1, where 48 such groups are shown by way of example, the U-shaped groups also being shown at 30 in FIGS. 2, 3 and being intended for the slider of FIGS. 5, 6 and 7. In this case, the polar distance is shortened to .075 inch.

As above noted, the groups or sectors of the slider 20 may be connected as described in the above noted application Ser. No. 658,578, wherein quadrature shift is avoided or reduced by balancing the quadrature windings about the same center line, and also according to Foster Ser. No. 624,057, filed November 23, 1956, for Wiring for Slider of Position Measuring Transformer, wherein unwanted capacity is reduced for each of the quadrature windings wherein the conductor groups which are physically adacent are connected in opposite relative positions of the current path.

With the slider 20 of the present invention, 96 active conductor portions or bars, one of which is indicated at 3 in FIG. 2, can be placed in the same space occupied by 64 bars of the old W type winding. Also, as shown in FIG. 2, the U-shaped groups or sectors indicated at 30, have parallel conductor portions 3 and are made longer than the continuous winding 4 of the scale 40 whereby the slider 20 has extended conductor portions indicated at 5 in FIG. 2 and their terminal connections 6 (corresponding to surplus of A over B in FIG. 8). The connections 6 extend through holes 31 in the glass block 32 as in the patent. The above applies to the upper end of the slider 20 as shown in FIG. 2. At its lower end, as shown in FIG. 3, the end turns like 7 (of the U groups 30) which extend parallel to the direction of relative movement of slider 20 and scale 40, are opposite a space 8 on the scale 40, such space extending between the end turns or bars 9 at the lower end of the continuous winding 4, and a spaced returned conductor 10 which extends lengthwise of the scale 40. Scale 40 has a plurality of sections one of which is indicated at 16 in FIG. 4.

As shown in FIG. 4, and also in FIG. 3, the continuous winding 4 of the scale section 16 extends around the edge 12 of the glass block 41, on which the winding is electrodeposited, as shown at 13, returning to the front as a terminal shown at 14. Also, the return conductor 10 extends the full length of the block 41. As shown in FIG. 4, conductor 10 also extends around the edge 12 of the block and returns to the front of the block as a terminal shown at 15. The portions 14 and 15 are thus terminals for the continuous winding 4 and its return conductor 10, and similar terminals are provided for the other end, not shown, of the block appearing in FIG. 4. The terminals 14 and 15 are shown in FIG. 5, and the corresponding terminals for the adjacent end of the next scale section 46 are shown at 17 and 18. The scale sections like 16 and 46 are provided in sufficient quantity to equal or exceed the length of travel of the slider 20.

The terminals like 14 and 15 at the end of scale section 16 are connected to the terminals like 17 and 18 at the adjacent end of the next scale section 46 by suitable spring contact blocks 21, 22 wired together as indicated at 23, as shown in FIG. 6 and 7.

The scale sections like 16 and 46 are mounted in fixed position with a suitable gap 24 between adjacent ends thereof, to preserve the pole spacing of the active conductor portions of its continuous winding like 4.

Various modifications may be made in the invention without departing from the spirit of the following claims.

I claim:

1. A position measuring transformer comprising relatively movable inductively related members of which one has a winding of parallel conductors having end connections connecting said conductors in series to form a continuous winding, said conductors extending transversely to the direction of relative movement of said members, said winding having a certain length in said transverse direction, the other member having active conductor portions connected in groups quadraturely related, said active conductor portions extending parallel to each other and to said conductors of said active continuous winding in juxtaposition thereto, said conductor portions of the other member thus extending for a length which is greater than said certain length to provide extended conductor portions, terminal connections for said extended conductor portions, said extended conductor portions and their said terminal connections being laterally removed from a position opposite the transversely extending conductors of said continuous winding, whereby the coupling between the windings of said members is substantially independent of said extended conductor portions and their terminal connections, wherein each of said groups is substantially U shaped, said parallel active conductor portions of the other member having a close spacing acting to increase the number of said conductor portions for the over-all pattern length and shift the group center lines close together, said close spacing being operative to cause each of said quadraturely spaced groups to substantially simultaneously scan a coupling discontinuity as it passes under said quadraturely related windings.

2. A position measuring transformer having relatively movable transformer members having a coupling with each other, each of said members having a winding having active conductor portions arranged in a plane and extending transversely of the direction of relative movement, one of said members having a continuous winding of parallel conductors in series, the other member having its winding in the form of space phase groups of substantially U-shaped active conductor portions having a close spacing, said close spacing being operative to cause each of said space phase groups to substantially simultaneously scan a coupling discontinuity in the winding of the other member as said last mentioned winding passes under the windings of said space phase groups.

References Cited in the file of this patent

UNITED STATES PATENTS 2,650,352     Childs     Aug. 25, 1953
2,799,835     Tripp     July 16, 1957